United States Patent Office 3,560,151
Patented Feb. 2, 1971

3,560,151
PROCESS FOR THE PRODUCTION OF FINELY DIVIDED SILICON DIOXIDE
Georg Vogt, Kempten, Allgau, Gunther Wiebke, Unterpfaffenhofer-Germering, and Ludwig Eberle, Sankt Mang, near Kempten, Germany, assignors to Elektroschmelzwerk Kempten G.m.b.H., Munich, Germany
Filed Aug. 1, 1967, Ser. No. 657,552
Claims priority, application Germany, Aug. 5, 1966, E 32,230
Int. Cl. C01b 33/18
U.S. Cl. 23—182
2 Claims

ABSTRACT OF THE DISCLOSURE

Silicon dioxide in finely subdivided form is produced by passing a mixture of silicon halides and oxygen through a turbulent, or fluidized bed of heated particles of solids which react with one or both of the gases passed therethrough. Examples of such solids include silicon carbide, ferrosilicon, silicon, and the like. The bed is preferably fluidized, and is maintained at a temperature of the order of at least 1000° C.

FIELD OF THE INVENTION

Figure 1:
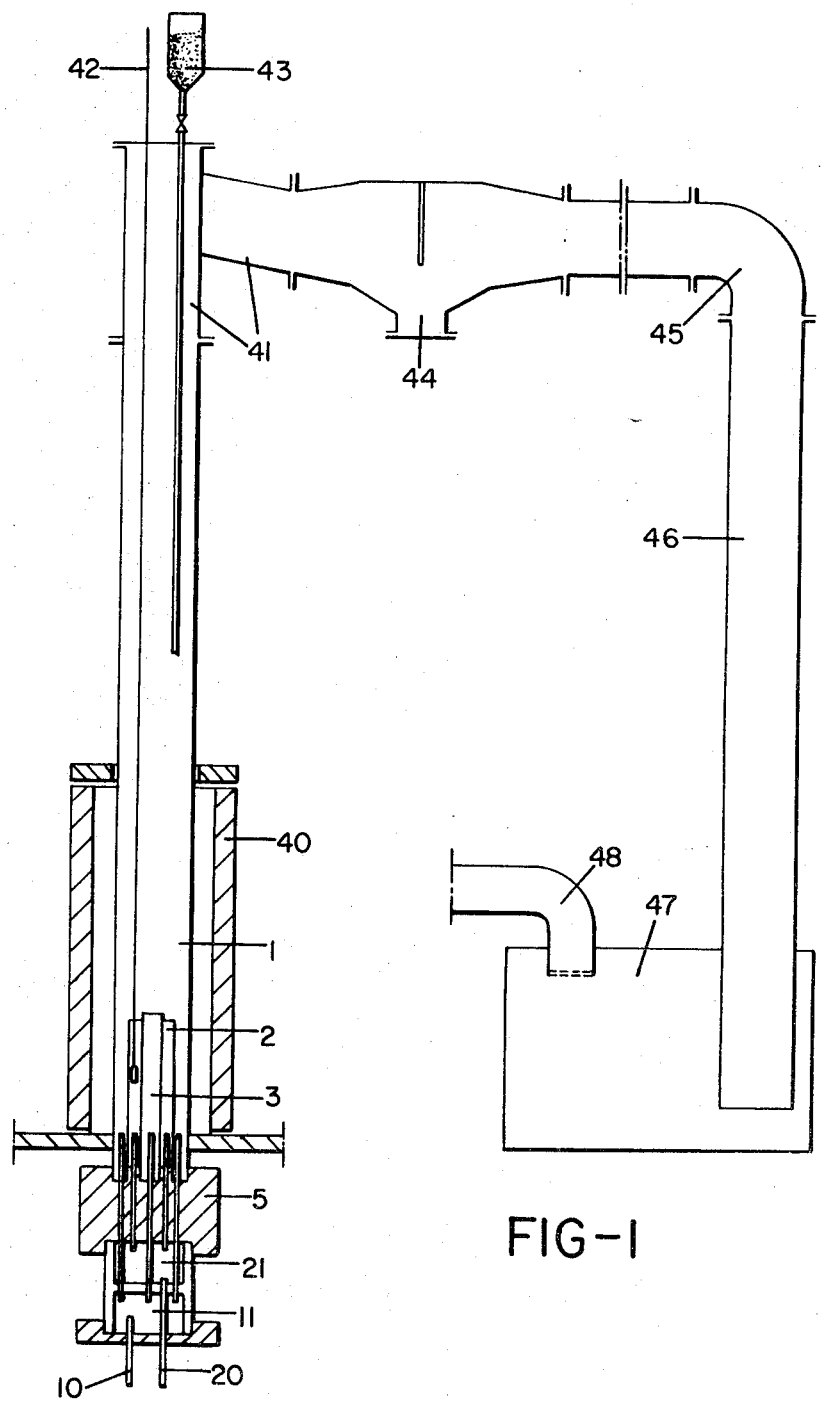

The present invention relates to the production of silicon dioxide in finely subdivided form. More particularly, it relates to the production of silicon dioxide in finely subdivided form by passing a mixture of a silicon halide and oxygen or oxygen-containing gas at elevated temperatures through a turbulent or fluidized bed of solids which react with one or more of the reactants passed therethrough.

PRIOR ART

It is well known that silicon halides, such as silicon tetrahalides, can be produced by reacting silicon, silicon carbide or ferrosilicon with halides. The silicon halides thus produced have been converted into silicon dioxide by such methods as vapor phase oxidation, vapor phase hydrolysis, or other known method. Such methods have not always given silicon dioxide of the desired form and properties and are also subject to certain procedural difficulties. The procedure of the present invention is designed to overcome difficulties experienced in the prior art processes and at the same time to give a uniform grade of silicon dioxide in finely subdivided form suitable for most commercial uses.

DESCRIPTION

It has now been discovered in accordance with the present invention that an especially good grade of finely subdivided silicon dioxide can be produced by reacting silicon halides with oxygen or oxygen-containing gases in the presence of solids which react with one or more of the gaseous reactants. This can conveniently be accomplished by passing the gaseous reactants through beds of the solid materials, which are preferably in particulate form in order to facilitate the reaction. While a stationary bed can be used, preferred results are obtained when the bed of solid particulates is in a turbulent or fluidized state. Solid particulates suitable for this purpose include silicon carbide, ferrosilicon or silicon used either separately or in mixtures thereof. Such materials may be substituted in part or in toto by carbon in the form of graphite or coke particulates.

When carrying out the process using a turbulent or fluidized bed of the solid particulates, the latter are maintained in a turbulent or fluidized state by regulating the flow of the reactants through the bed of particulates. A uniform turbulent or fluidized bed is obtained by known methods of regulating the size of the particulates and by regulating the pressure gradient of the reactant gases before and after the bed. The pressure gradient, in general, is determined by the particle size of the particulates which, preferably, range from 50 to 1000 microns in diameter. When a stationary bed is employed, it is generally preferable to use somewhat larger particulates.

The reactant gases suitable for use in the process of the present invention include oxygen or oxygen-containing gases substantially free from materials which have an undesirable effect on the reaction or the silicon dioxide formed thereby, and suitable halogen and/or silicon halogen compounds. The preferred silicon halogen compounds include silicon halides and/or haloorganicsilanes, i.e. silanes. Silicon tetrachloride is a preferred form of a silicon halide and chloroorganosilanes, such as chloromethylsilanes, and particularly trichloromethylsilanes, or mixtures of the latter with chlorodimethylsilanes represent preferred forms of suitable haloorganosilanes which can be used. It should be understood, however, that other analogous halogen compounds can also be satisfactorily employed.

A suitable form of chloroorganosilane for use in the process includes the liquid recovered as a residue boiling above 70° C. at 760 mm. Hg during the distillation of the products resulting from the reaction between methyl chloride and silicon.

Because of the strongly exothermic character of the reaction which takes place between the reactant gases, i.e. oxygen or an oxygen-containing gas, and the halogen and/or silicon halogen compounds used in the present invention, it is desirable, in order to avoid local overheating of the stationary or fluidized bed of solid particulates, to mix with the reactant gases a gas, such as nitrogen, which is inert to the reactants and reaction products. By so doing, it is possible to maintain a more uniform temperature in the bed.

In order to prevent the silicon dioxide formed in the process from depositing on the solids in the bed, the process is carried out in a manner such that the silicon dioxide formation proper takes place out of the stationary or fluidized bed. This is accomplished by including in the mixture of reactant gases an amount of oxygen insufficient for the formation of silicon dioxide, the remainder of the oxygen necessary for the formation of silicon dioxide being added to the silicon-containing gases above the stationary or fluidized bed. It is preferred to add separately an excess of oxygen or oxygen-containing gas, e.g. 40–90% excess, to the silicon-containing gases above the stationary or fluidized bed.

According to an alternate method, the entire amount of oxygen or oxygen-containing gas required for the formation of the silicon dioxide is passed through the stationary or fluidized bed in a manner so that only a portion of the oxygen in the gaseous reaction mixture reacts with the silicon while in the bed. This is accomplished either by including an inert gas in the reaction mixture, or by increasing the rate at which the reactant gases pass through the bed.

The temperature of the stationary or fluidized bed is preferably maintained within the range of 300–1800° C. Even though the halogenation reaction and also the reaction with oxygen are both exothermic reactions, it is sometimes necessary to add additional heat to the stationary or fluidized bed in order to maintain the required temperature thereof. This may be done in any convenient manner, as by externally heating the reactor, by heating the stationary or fluidized bed directly or indirectly, as by the introduction of a solid or gaseous material into the bed and burning it therein with oxygen or oxygen-containing gases, or by heating the gaseous reactants before introduction into the reaction zone.

The temperature of the gases reacted in the upper part or above the stationary or fluidized bed must be sufficiently high for the formation of silicon dioxide. In order to obtain the temperature necessary at this point, external heat may be applied or a combustible gas, such as carbon monoxide, may be added, if necessary.

If it is desired that the silicon dioxide formed contain the oxides of other elements as, for example, those of iron or titanium, this can be accomplished by suitably adjusting the reactants, or by a separate addition, it being possible to vary the amounts within fairly wide limits.

The above procedure can be carried out in various ways and it is understood that we are not restricted to any particular apparatus or procedure and that various modifications thereof which fall within the broad concept disclosed above are intended to fall within the scope of the appended claims.

Figure 2:
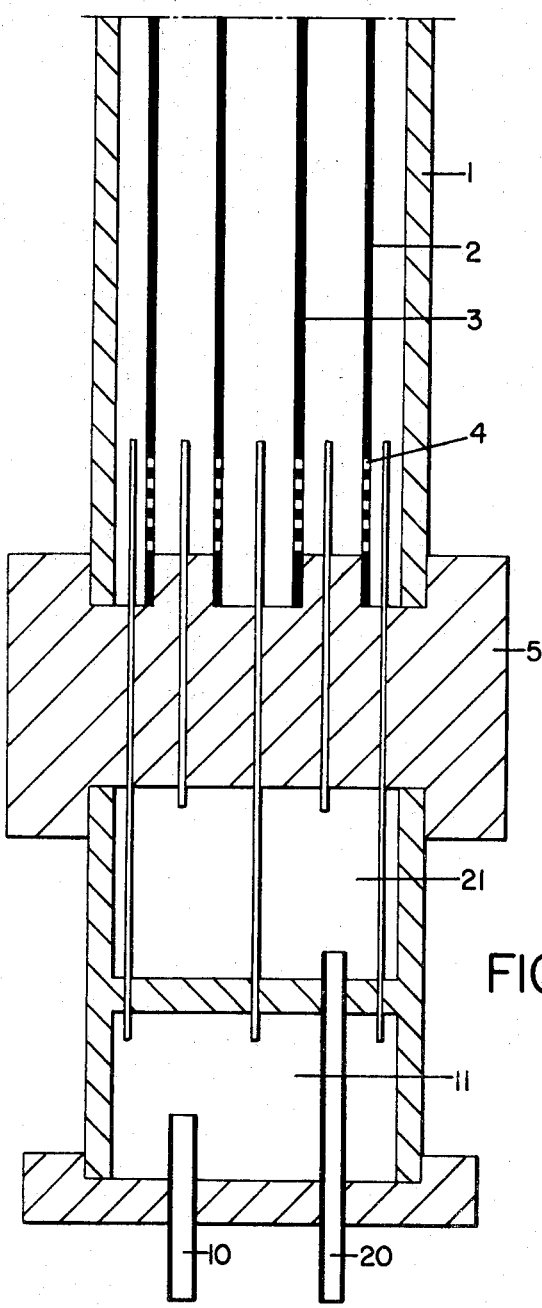
Figure 3:
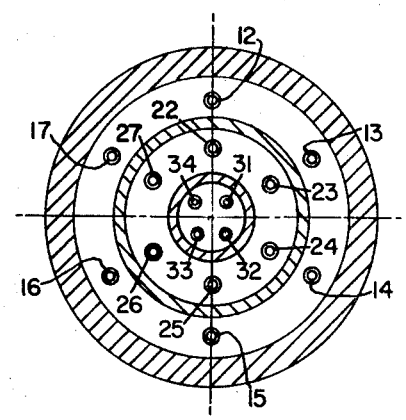

For sake of illustration, the process employing a fluidized bed of solid particulates of the type disclosed above is described below using the apparatus shown in FIGS. 1–3.

The reaction tube is a vertical quartz tube 1 (FIG. 1) having an internal diameter of 5 cm. and a length of 140 cm. The lower half of the tube is heated by a concentrically placed electrical furnace 40. To the upper end of the tube is connected, by means of a flange-joint, a branching piece 41, at the upper end of which is placed a closure part with openings for the introduction of a thermocouple 42 and a feed device 43 for supplying material for the fluidized bed. To the branching piece 41 is connected a small trap 44, in which any entrained solids in the gases may deposit, and a curved tube 45 connected to a tube 46 which leads downwardly to a receiver 47. The waste gases are evacuated by suction through an evacuation tube 48, which is equipped with a filter, at the upper side of the receiver 47.

The gaseous reactants are introduced into the lower end of the reaction tube through the closure thereof 5 which contains several passages. This closure 5 can conveniently be a block of ceramic material provided with several vertical channels. In order to introduce the reactant gases at a point above the bottom of the fluidized bed in the reaction tube, use is made of small ceramic tubes located in the channels of the closure 5. These tubes protrude by 25–40 mm. beyond the ceramic closure 5 and are arranged as shown in FIG. 3.

The reaction space proper in the arrangement described above is located in the lower one-fourth of the quartz tube 1 but it may occupy a larger or smaller portion of the reaction tube 1, depending upon the length and diameter of the latter. The fluidized-bed space, represented by the two concentrically placed quartz tubes 2 and 3 having an internal diameter of 36 mm. and 11 mm. respectively and a length of about 25 cm., is subdivided into three parts.

The two internal quartz tubes have at their lower ends, e.g., at about 25 mm. from the top, openings 4 (FIG. 2) through which the fluidized bed material flows into the various sub-spaces. The distribution of the fluidized bed material may likewise be effected by placing the tubes upon a support or upon a perforated plate, the height of which above the bottom will depend upon the circulation of the fluidized bed material.

The fluidized bed material, such as silicon carbide particulates, is introduced into the reaction tube 1 through the feed device 43. In order to regulate the pressure drop ahead of and behind the fluidized bed, nitrogen is introduced through the gas supply lines 12–34 (FIG. 3).

The fluidized bed material is heated to about 1000° C., as measured by the thermocouple 42, by means of the electric furnace 40.

Silicon halides, such as silicon tetrachloride, are produced by evaporation and introduced through conduit 20 (FIG. 2) into space 21 from which the silicon halide vapor is passed through tubes 22–27 (FIG. 3) into the space between the quartz tubes 2 and 3 of the fluidized bed. Oxygen in a mole ratio of 1:0.5 to 1:0.8 is added to the silicon halide vapor, the proportion of oxygen being regulated so that the silicon dioxide formed does not precipitate upon the fluidized bed material.

Oxygen is introduced through conduit 10 into space 11 from which it is passed through the small tubes 12–17 and 31–34 (FIG. 3) into the space occupied by the fluidized bed, which lies between tubes 1 and 2 and inside tube 3. In this manner, the oxygen supply is such that a complete oxidation to silicon dioxide is assured.

The silicon dioxide is obtained in the form of an aerogel which is removed from the gas stream at the head of the reaction tube 1 through the connecting conduit 41. The gas stream containing the silicon dioxide is passed through the trap 44 to remove any entrained solids and then through conduit 46 into the receiver 47. The product obtained is collected in a very voluminous form.

To illustrate the process further, the following specific examples are given. It will be understood, however, that various modifications of the specific procedures set out will occur to one skilled in the art. Such modifications, however, are deemed to fall within the basic concept of the present invention.

Example 1

Into the reaction tube 1 of the apparatus described above was introduced 500 grams of silicon carbide in particulate form having diameters of the order of 150–180 microns. Through this bed, a stream of nitrogen gas was then passed at the rate of 400 liters per hour in order to render the silicon carbide particles turbulent. The temperature of the turbulent particles was raised to 1000° C. by means of an electric furnace.

In an evaporator placed directly under the reaction tube 1, silicon tetrachloride was evaporated at the rate of 10 mls. per minute. To the stream of silicon tetrachloride vapor thus produced, oxygen gas was added at the rate of 60 liters per hour and the resulting mixture then introduced into the fluidized bed, prepared as above described, through tubes 22–27. Thereafter, through feed lines 12–17 and 31–34, oxygen gas was introduced into the fluidized bed at the rate of 300 liters per hour. As soon as the fluidized bed became stabilized by the reaction gases, the flow of the stream of nitrogen was stopped. At the end of 5 hours operation under the above conditions, 85 grams of good commercial grade silicon dioxide had been produced.

Example 2

In this experiment, the operation was carried out as described in Example 1, using as the fluidized bed material 500 grams of silicon carbide in particle form having diameters of 150–180 microns. Silicon tetrachloride was fed from the evaporator into the fluidized bed at the rate of 6 ml. per minute. With this vapor was mixed chlorine vapor at the rate of 50 liters per hour and oxygen at the rate of 75 liters per hour. Additional oxygen was fed into the fluidized bed through tubes 12–17 and 31–34 at the rate of 250 liters per hour.

After operating for 60 minutes under the above conditions and cooling the fluidized bed, it was found that 58 grams of silicon carbide had been reacted. This indicated that 13 grams more of the silicon carbide had reacted than corresponded to the amount of chlorine added. The silicon dioxide formed was of good commercial quality.

Silicon dioxide of the same good quality was obtained when the experiment was repeated with silicon substituted for the silicon carbide as well as when a mixture of trichloromethylsilane and dichlorodimethylsilane was substituted for the silicon tetrachloride.

Example 3

In this experiment, the quartz tubes 2 and 3 of the apparatus described above were substituted by quartz tubes of the same diameter but 45 cm. in length and which were not equipped at the end with openings. The space between the tubes 1 and 2, as well as the internal space of the tube 3 was filled with Corundum beads having a diameter of 2-3 mm. Upon the upper ends of the tubes 2 and 3 was placed a ceramic plate equipped with openings whereby the mixing of the reaction gases was brought about. The gas supply through the tubes 23, 25 and 27 was effected separately from one of the small tubes 22, 24 and 26. Also, the length of the gas supply lines 23, 25 and 27 was increased by 20 cm. by the attachment of small tubes. Into the space between the tubes 2 and 3 was placed a bed of calcined petroleum coke about 35-40 cm. high, having particle sizes of 240-280 microns diameter. This bed was then rendered turbulent or fluidized by blowing air through the inlets 22, 24 and 26. The temperature of the fluidized bed was raised to 1100° C. by external heating and maintained at this temperature, after cutting off the external heat, by flowing air through at the rate of 200 liters per hour. Through the tubes 23, 25 and 27 was then introduced silicon tetrachloride vapor at the rate of 20 liters per hour into the upper half of the fluidized bed. Through the openings 12-17 and 31-34, air was introduced at the rate of 300 liters per hour and reacted with the reaction gases above the fluidized bed to produce silicon dioxide in finely divided form and good commercial quality.

Silicon dioxide of similar properties was obtained when using a mixture of trichloromethylsilane and dichlorodimethylsilane instead of silicon tetrachloride.

What is claimed is:

1. A process for the manufacture of silicon dioxide in finely divided form which comprises:
    (a) passing a silicon chloride in vapor form with a gas selected from the group consisting of oxygen and oxygen-containing gas upwardly through a fluidized bed consisting of silicon carbide reactant particulates, wherein the said particulates are in the range size of from about 150-180 microns in diameter and said bed is maintained at a temperature of at least about 1,000° C., and the amount of oxygen or oxygen-containing gas passed through the heated fluidized bed is insufficient to produce any substantial amount of formed silicon dioxide from depositing on the silicon carbide particulates in said bed;
    (b) separately adding 40%-90% of an excess of the oxygen necessary for the formation of silicon dioxide to the silicon-containing gases above the fluidized bed and in the presence of an external heat at a temperature sufficiently high for the formation of silicon dioxide;
    (c) recovering the silicon dioxide in voluminous, finely divided form from the entraining gas thus produced and containing same by cooling.

2. Process in accordance with claim 1, wherein the silicon chloride is selected from the group consisting of silicon tetrachloride, trichloromethylsilane and dichlorodimethylsilane.

References Cited

UNITED STATES PATENTS

| | | | |
|---|---|---|---|
| 875,286 | 12/1907 | Potter | 23—182 |
| 2,626,874 | 1/1953 | Pipkin | 23—182X |
| 3,105,742 | 10/1963 | Allen et al. | 23—202 |
| 3,188,173 | 6/1965 | Hughes et al. | 23—182X |
| 3,306,760 | 2/1967 | Zirngibl et al. | 23—182X |
| 3,395,091 | 7/1968 | Sinclair | 23—182X |
| 2,614,906 | 10/1952 | Spialter et al. | 23—182 |
| 3,258,310 | 6/1966 | Arkless et al. | 23—182 |

FOREIGN PATENTS

| | | | |
|---|---|---|---|
| 797,374 | 7/1958 | Great Britain | 23—182 |

EDWARD STERN, Primary Examiner